(12) United States Patent
James et al.

(10) Patent No.: US 10,507,751 B2
(45) Date of Patent: Dec. 17, 2019

(54) BEARING FOR USE IN SEAT BACK ASSEMBLIES

(71) Applicant: SAINT-GOBAIN PERFORMANCE PLASTICS RENCOL LIMITED, Coventry (GB)

(72) Inventors: Neil James, Chepstow (GB); Llewelyn Pickering, Pandy (GB); James K. Burgess, Bristol (GB); Alfred J. Lethbridge, Exeter (GB); Ciaran Morrison, Bristol (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 0 days.

(21) Appl. No.: 16/234,676

(22) Filed: Dec. 28, 2018

(65) Prior Publication Data

US 2019/0202329 A1    Jul. 4, 2019

Related U.S. Application Data

(60) Provisional application No. 62/611,626, filed on Dec. 29, 2017.

(51) Int. Cl.
*B60N 2/80* (2018.01)
*B60N 2/824* (2018.01)
(Continued)

(52) U.S. Cl.
CPC ............. *B60N 2/824* (2018.02); *B60N 2/809* (2018.02); *B60N 2/897* (2018.02); *B60N 2205/20* (2013.01)

(58) Field of Classification Search
CPC ........ B60N 2/824; B60N 2/809; B60N 2/897; B60N 2/4817; B60N 2/4814; B60N 2/812; B60N 2/821
(Continued)

(56) References Cited

U.S. PATENT DOCUMENTS 3,197,243 A * 7/1965 Brenneke ................ F16C 27/00
                                                          403/372
3,498,672 A    3/1970 Leichtl
(Continued)

FOREIGN PATENT DOCUMENTS

WO    2016060660 A1    4/2016

OTHER PUBLICATIONS

International Search Report and Written Opinion for PCT/EP2018/097107 dated Apr. 11, 2019, 12 pages.

*Primary Examiner* — Mark R Wendell
(74) *Attorney, Agent, or Firm* — Abel Schillinger, LLP; Chi Suk Kim (57) ABSTRACT

A head restraint assembly including a headrest including an inner member, a seat back including an outer member, and a bearing disposed between the inner member and the outer member, the bearing including at least one leaf spring adapted to bias the inner member, where the leaf spring includes a substrate and a low friction layer overlying the substrate, where the leaf spring includes an inner portion and a plurality of outer portions, where the outer portions include end portions of the leaf spring that are folded over such that the outer portions overlie the inner portion, forming a folded edge, where the headrest is adapted to translate with respect to the seat back, and where the seat back is adapted to receive the headrest such that the headrest is height adjustable relative to a seat back.

15 Claims, 7 Drawing Sheets

(51) Int. Cl.
*B60N 2/897* (2018.01)
*B60N 2/809* (2018.01)

(58) Field of Classification Search
USPC ........ 297/410, 391, 406, 397; 403/367, 371, 403/372
See application file for complete search history.

(56) References Cited

U.S. PATENT DOCUMENTS

| | | | | |
|---|---|---|---|---|
| 4,650,250 | A * | 3/1987 | Krugener | B60N 2/826 297/410 |
| 5,788,250 | A * | 8/1998 | Masters | B60N 2/826 297/410 |
| 7,434,886 | B2 * | 10/2008 | Yamada | B60N 2/818 297/410 |
| 8,991,927 | B2 * | 3/2015 | Wisniewski | B60N 2/809 297/410 |
| 9,446,692 | B2 * | 9/2016 | Hagan | B60N 2/897 |
| 2003/0205925 | A1 * | 11/2003 | Ford | B60N 2/818 297/410 |
| 2006/0087167 | A1 * | 4/2006 | Kraft | B60N 2/0232 297/410 |
| 2013/0206930 | A1 | 8/2013 | Gottwald et al. | |

* cited by examiner

BEARING FOR USE IN SEAT BACK ASSEMBLIES

CROSS-REFERENCE TO RELATED APPLICATION(S)

This application claims priority under 35 U.S.C. § 119(e) to U.S. Patent Application No. 62/611,626 entitled "BEARING FOR USE IN SEAT BACK ASSEMBLIES," by Neil JAMES et al., filed Dec. 29, 2017, which is assigned to the current assignee hereof and incorporated herein by reference in its entirety.

FIELD OF THE DISCLOSURE

The present disclosure relates to bearings and seat back assemblies for vehicles.

RELATED ART

Vehicles include vehicle seat assemblies for supporting vehicle occupants. The seat assemblies typically include a substantially horizontal seat cushion and a generally upright seat back pivotally connected to the seat cushion by some attachment mechanism. Seat assemblies also typically include a head restraint extending from a top face of the seat back. The head restraint is typically movable between a plurality of head restraint positions relative to the seat back to accommodate a wide range of occupant heights.

It is widely practiced in vehicle seat assemblies to support the head restraint at the top of the seat back with a spaced apart pair of posts. Each of the posts can extend outward from the head restraint and can be inserted into a corresponding mounting fixture in the seat back. Traditionally a bearing may be used to facilitate sliding of the posts into the seat back via the mounting fixture. However, misalignment of the post within the mounting fixture or bearing can cause undesirable noise, vibration, sliding, and harshness characteristics. Therefore, a need still exists for improved vehicle seat assemblies.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the head restraint arts.

The present head restraint assembly is adapted to provide consistent sliding resistance and adjustability. The concepts are better understood in view of the embodiments described below that illustrate and do not limit the scope of the present invention Referring initially to FIGS. 1-2, a vehicle seat 1000 is partially illustrated. The seat 1000 can include a seat bottom (not shown) that may be mounted within a vehicle. The seat 1000 can further include a head restraint assembly 1. The head restraint assembly 1 can include a seat back 4 that may be mounted to one of the seat bottom or the vehicle. The seat back 4 can include an outer member 201. The head restraint assembly 1 can also include a headrest 2. The headrest 2 can include an inner member 101. The head restraint assembly 1 can further include at least one bearing 300, 302. The at least one bearing 300, 302 may be disposed between the inner member 101 and the outer member 201. In an embodiment, the headrest 2 can be engaged with a top surface 6 of the seat back 4. Further, in an embodiment, the headrest 2 can be engaged with at least one aperture 7, 7' within the seat back 4. The head rest 2 can be adapted to translate with respect to the seat back 4 in the upward direction (indicated by direction 900) or the downward direction (indicated by direction 902). In this regard, the seat back 4 can be adapted to receive the headrest 2 such that the headrest 2 can be height adjustable relative to the seat back 4, (i.e. adjusted to accommodate passengers of various heights).

Figure 1:
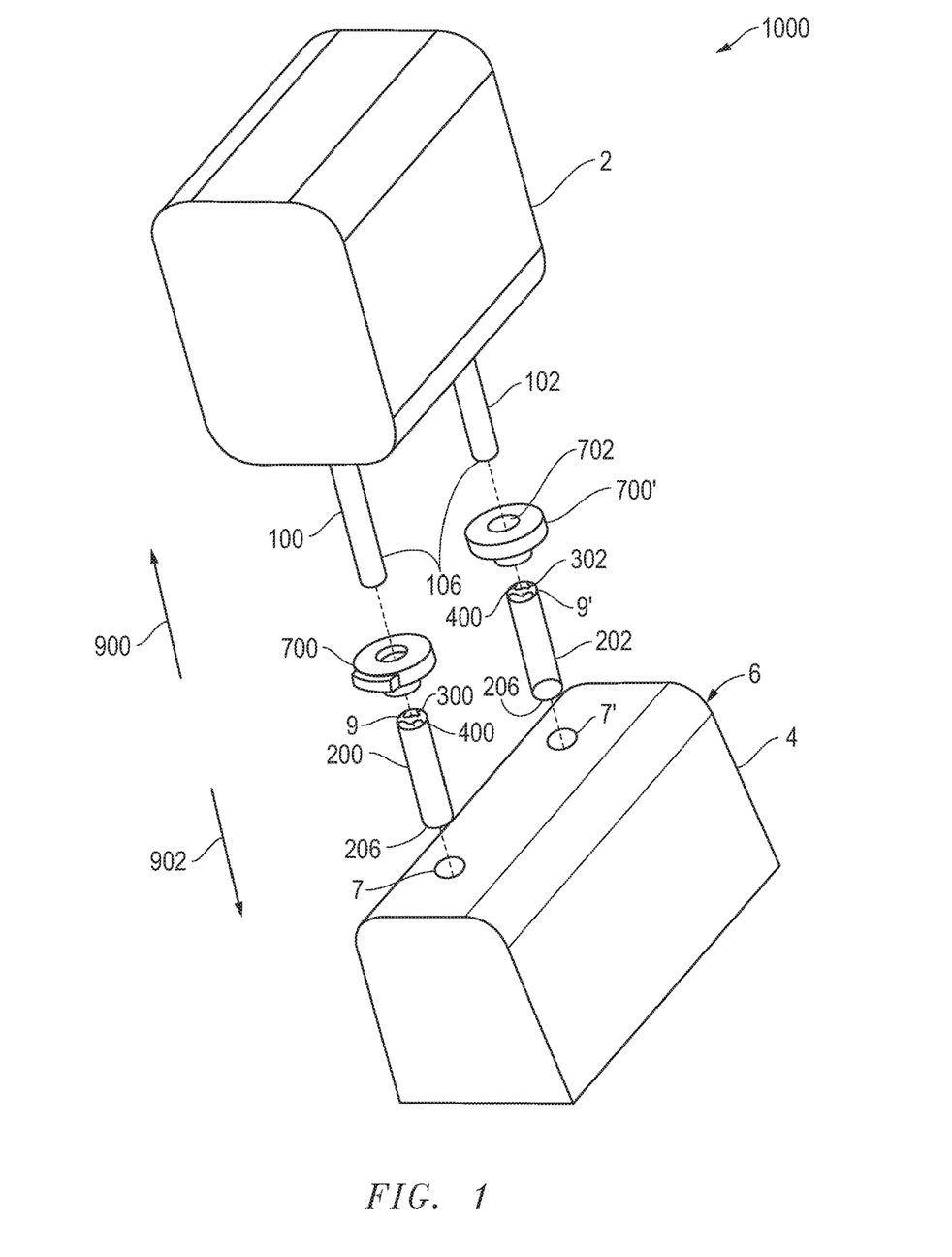
FIG. 1 includes an exploded perspective view of a head restraint assembly in accordance with an embodiment.
Figure 2:
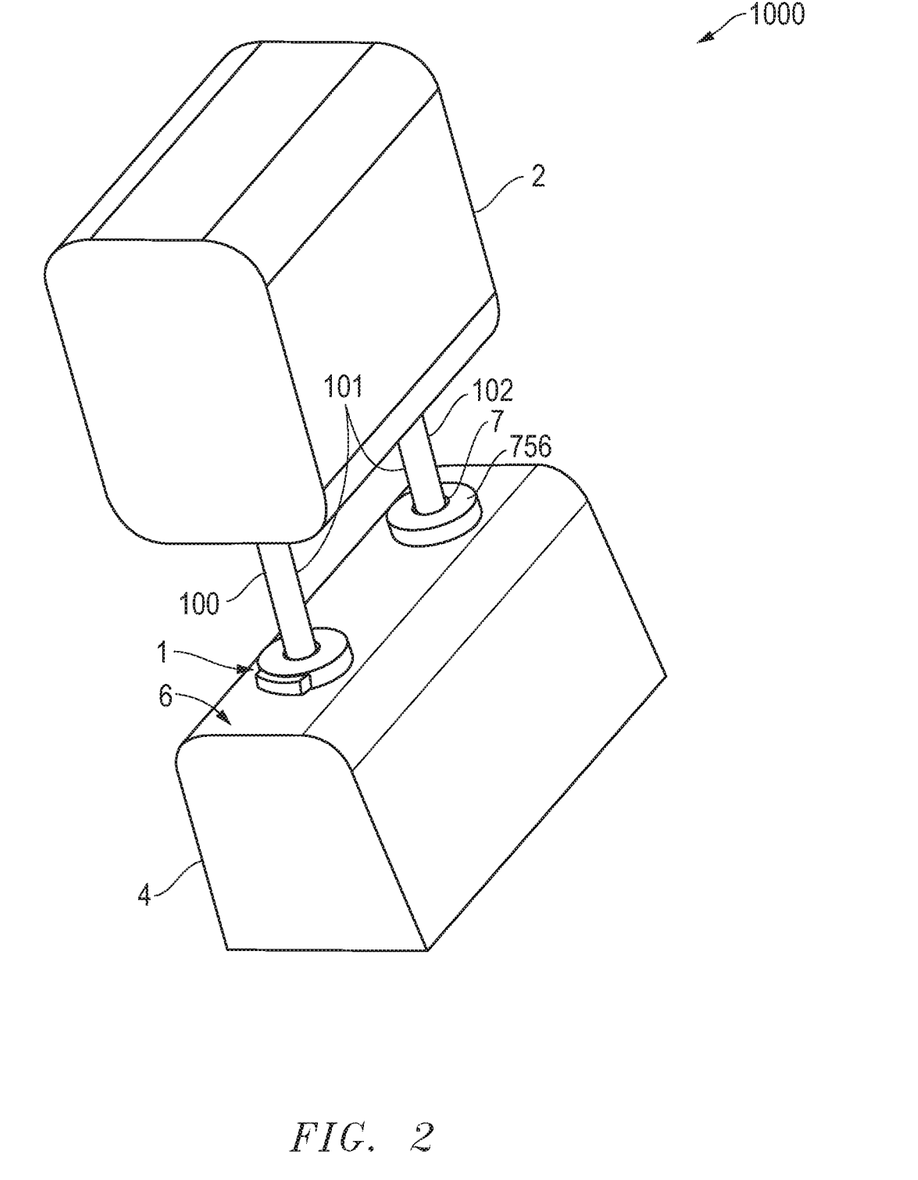
FIG. 2 includes a perspective view of a head restraint assembly in accordance with an embodiment.

Referring to FIG. 1 through FIG. 3C, as stated above, the head restraint assembly 1 can include at least one of a headrest 2 including an inner member 101. The inner member 101 can include a first post 100 and optionally a second post 102 extending from the headrest 2. Further, the head restraint assembly 1 can include a seat back 4 including an outer member 201. The outer member 201 can include a housing 201 including a first guide sleeve 200 engaged with the first post 100, and optionally a second guide sleeve 202 engaged with the second post 102. The head restraint assembly 1 can further include a first bearing 300 having a first and second distal end, and a locking mechanism 700. Optionally, the head restraint assembly 1 can further include a second bearing 302 having a first and second distal end. The first and second bearings 300, 302 can each have a first end 306 and a second end 308, the second end 308 having substantially the same shape as the first end 306. The locking mechanism 700 can be engaged to the first end 306. In a number of embodiments, the first post 100 and the second post 102 both may be disposed in the outer member 201 (e.g., the first guide sleeve 200 and the second guide sleeve 202 respectively) between the first and second bearings 300, 302 respectively, as shown in FIGS. 1-2.

In a particular embodiment, the head cushion 2 can be made of a foamed polymer material and can have an internal framework. The head cushion 2 can further include an outer material selected to cover the foamed plastic, such as, for example, a vinyl, a fabric, a leather, or a combination thereof. The internal framework can comprise any rigid material sufficient to support the head cushion 8. The internal framework can be formed from several axial members affixed together or from a single piece. Extending from the internal framework can be the inner members 101 (including the first and/or second posts 100 and 102). The inner member 101 (including the first and/or second posts 100 and 102) can include a polymer. The inner member 101 (including the first and/or second posts 100 and 102) can include a metal or alloy thereof. In a particular embodiment, the inner member 101 (including the first and/or second posts 100 and 102) can include a ceramic. In a particular embodiment, inner member 101 (including the first and/or second posts 100 and 102) can include a composite material including a polymer, metal, alloy, ceramic, or combination thereof. The posts 100, 102 can be integral with the framework or can be attached to the framework in any manner recognizable to one having ordinary skill in the art. For example, the posts 100, 102 can be welded to the framework. Alternatively, the posts 100, 102 can be mechanically deformed to engage the framework (e.g., the posts 100, 102 being crimped or bent around the framework). Alternatively, the posts 100, 102 can be affixed to the framework by a threadable engagement, or other similar type fastener. In a further embodiment, the first and second posts 100, 102 extend from the head cushion 2 in a parallel or substantially parallel fashion. As used herein, "substantially parallel" refers to a relative angle as formed between two lines or planes of no greater than 10°, such as no greater than 5°, or even no greater than 1°. As used herein, "parallel" refers to a relative angle as formed between two lines or planes of no greater than 0.1°.

In a particular embodiment, the seat back 4 can be made of a foamed polymer material and can have an internal framework. The seat back 4 can further include an outer material selected to cover the foamed plastic, such as, for example, a vinyl, a fabric, a leather, or a combination thereof. The internal framework can comprise any rigid material sufficient to support a user within the seat 1000. The internal framework can be formed from several axial members affixed together or from a single piece.

In a particular embodiment, the outer member 201 (including the first guide sleeve 200 and/or second guide sleeve 202) can include a polymer material. In a particular embodiment, the outer member 201 (including the first guide sleeve 200 and/or second guide sleeve 202) can include a metal or alloy thereof. In a particular embodiment, the outer member 201 (including the first guide sleeve 200 and/or second guide sleeve 202) can include a ceramic. In a particular embodiment, the outer member 201 (including the first guide sleeve 200 and/or second guide sleeve 202) can include a composite material including a polymer, metal, alloy, ceramic, or combination thereof.

In a number of embodiments the seat back 4 can include an aperture 7. In a number of embodiments, the seat back 4 can include first aperture 7 and a second aperture 7'. The apertures 7, 7' may be adapted to house or surround at least a part of the inner member 101 (including the first post 100 and/or second post 102), the outer members 201 (including the first guide sleeve 200 and/or second guide sleeve 202), and/or the first and/or second bearings 300, 302. In a number of embodiments, the first bearing 300 may be located between the first post 100 and the first guide sleeve 200) while the second bearing 302 may be located between the second post 102 and the second guide sleeve 202 within each aperture 7, 7' of the seat back 4 respectively. The apertures 7, 7' can extend in a substantially parallel or parallel orientation to the posts 100, 102 of the head cushion 2.

Figure 3A:
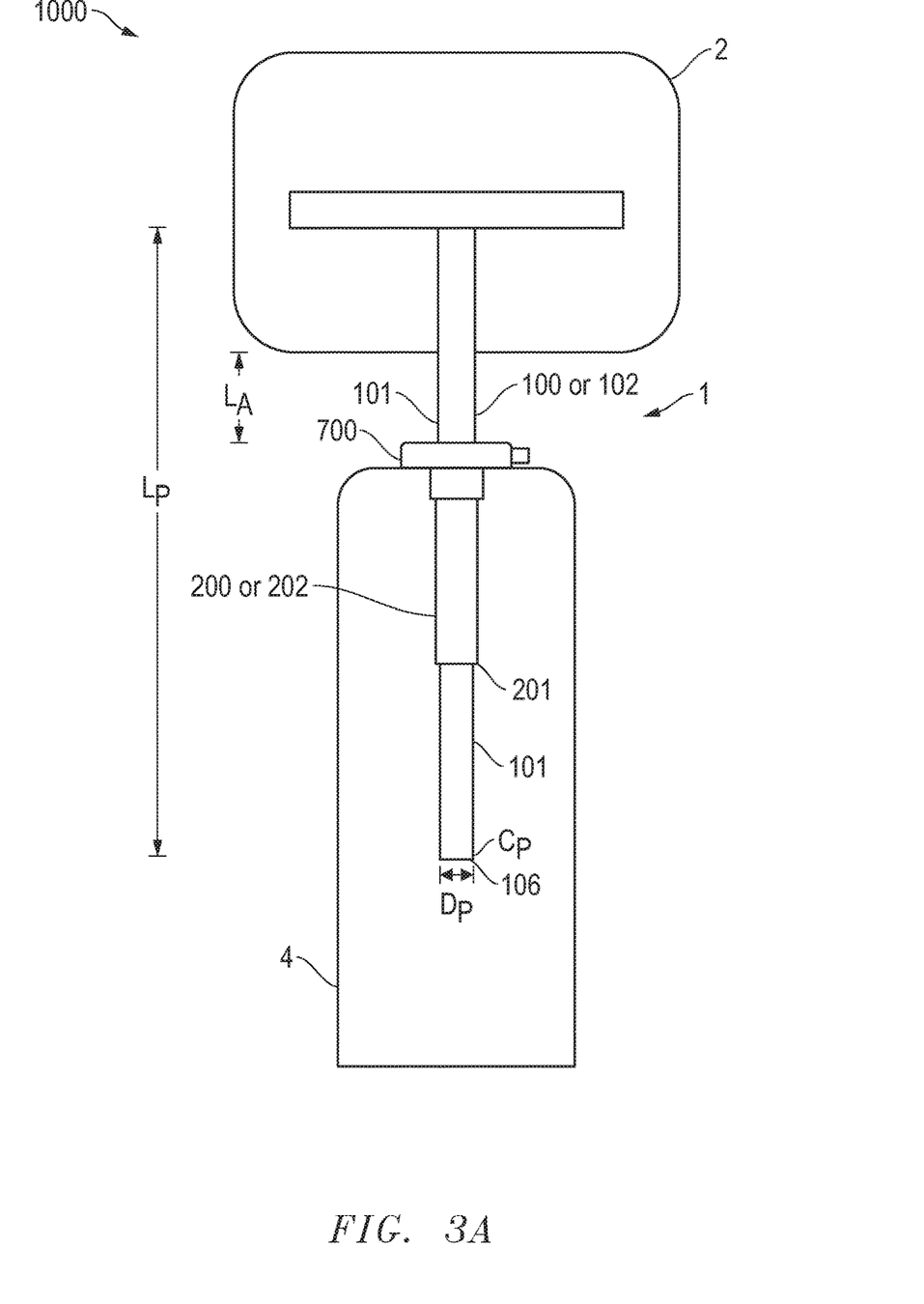
FIG. 3A includes a cross-sectional side plan view of a head restraint assembly in accordance with an embodiment.
Figure 3B:
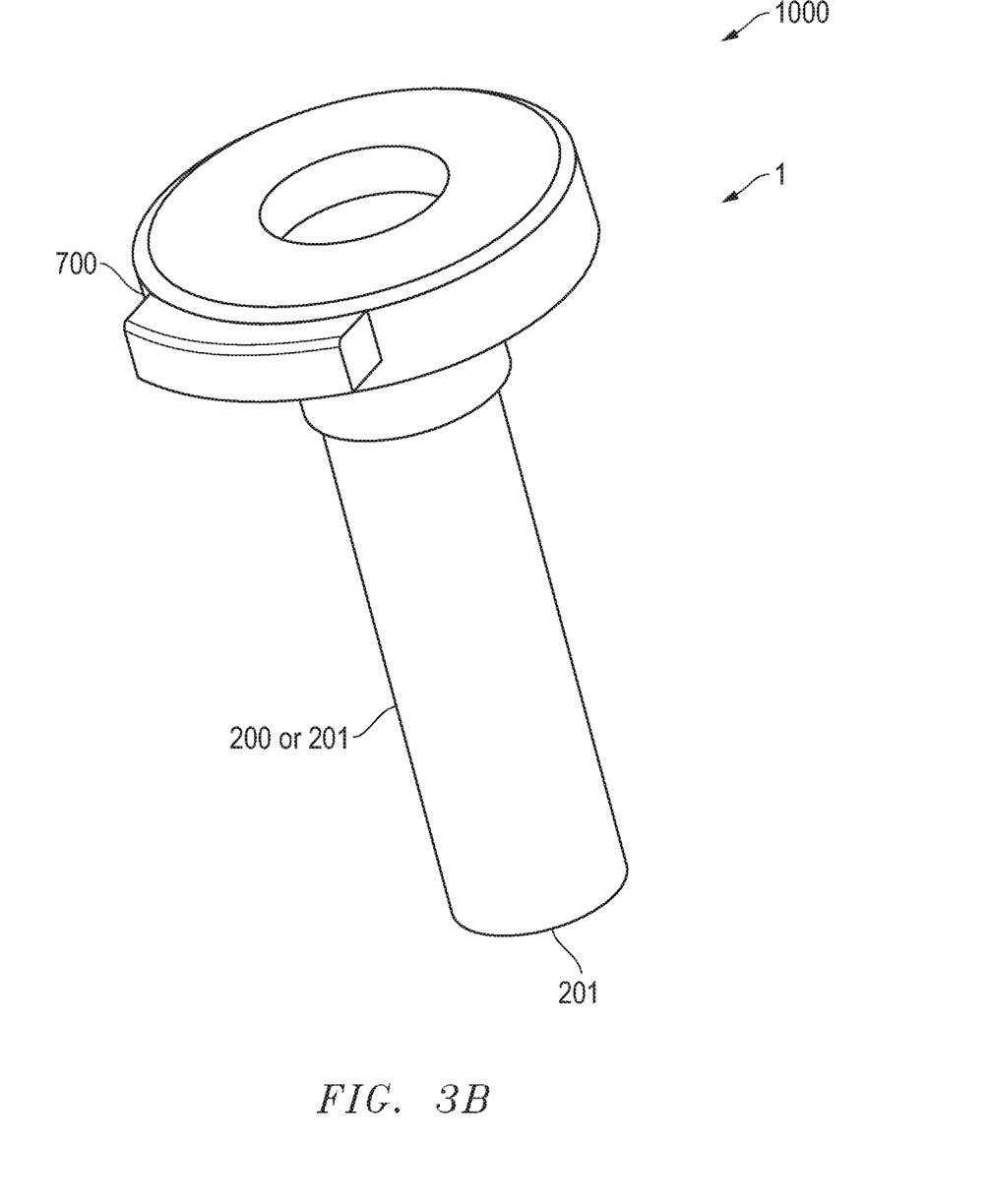
FIG. 3B includes a perspective view of an outer component in accordance with an embodiment.
Figure 3C:
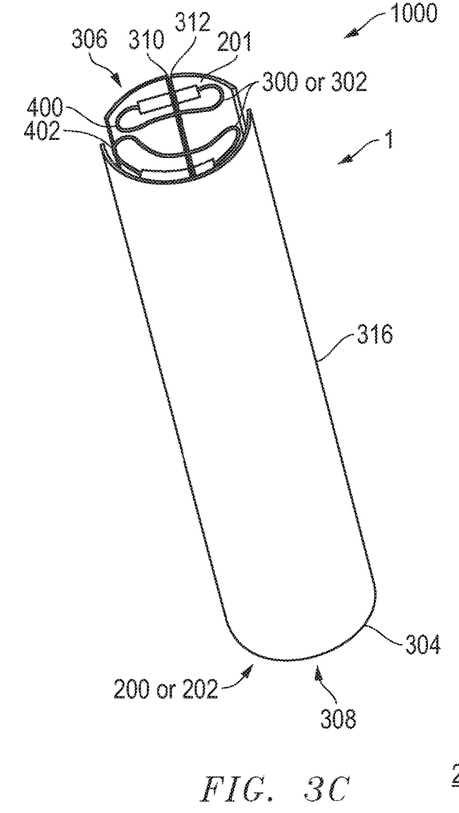
FIG. 3C includes a perspective view of an outer component and a bearing in accordance with an embodiment.

In a number of embodiments, as shown in FIG. 3A, the posts 100, 102 can have a diameter, $D_P$, a circumference, $C_P$, and a length, $L_P$. The diameter, $D_P$, may be between 10 and 35 mm. The length, $L_P$, may be between 25 and 1000 mm. In a particular embodiment, the posts 100, 102 can be sized such that they may be of equal or variable lengths. The posts 100, 102 can be made from a material selected from metal, composite, polymer, ceramic, or any other material having sufficient rigidity and strength to withstand both lateral and axial forces exhibited during vehicular operation.

In a particular embodiment, at least a portion of the posts 100, 102 can be formed of straight, cylindrical rods. In a more particular embodiment, the posts 100, 102 can have one or more radial bends 104 therein. The radial bends 104 can offset the head cushion 2 from the seat back 4. In yet another embodiment, the posts 100, 102 can each include an articulated joint to enable rotational adjustment of the head cushion 2 relative to the seat back 4. In this regard, the head cushion 2 can be rotatably articulated around the top of the posts 100, 102. The articulated joint can be located within the head cushion 2.

Figure 4:
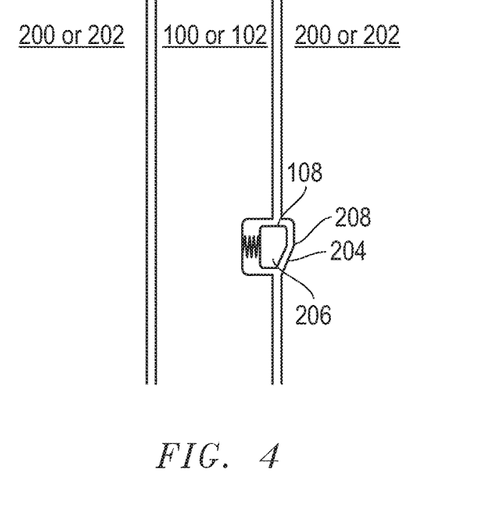
FIG. 4 includes a cross-sectional side view of a stop feature adapted to engage a post within a guide sleeve in accordance with an embodiment.

In a particular aspect, at least one of the posts 100, 102 can have a stop feature 108 (FIG. 4). The stop feature 108 can be adapted to engage with the locking mechanism 700 affixed to the seat back 4. In a particular aspect, the stop feature 108 can be a radial groove or channel extending at least partially around the circumference, $C_P$. The locking mechanism 700 may lock or fix the inner member 101 (including the first post 100 and/or second post 102) with the outer members 201 (including the first guide sleeve 200 and/or second guide sleeve 202) at a certain height depending on the user of the vehicle seat 1000.

Referring again to FIG. 1 through FIG. 3B, the guide sleeves 200, 202 can include a locking mechanism 700, 700'. The locking mechanism 700, 700' can be engaged with the seat back 4 so as to prevent the posts 100, 102 from translating undesirably relative thereto. The locking mechanism 700 can be formed with an internal bore 702 adapted to receive one of the posts 100, 102.

In a particular embodiment, the assembly 1 can include guide sleeves 200, 202 adapted to be engaged with one of the first and second posts 100, 102. In a number of embodiments, the first guide sleeve 200 can include a locking mechanism 700 and bearing 300. The other of the guide sleeves 200, 202 can include a locking mechanism 700' and bearing 302.

In another embodiment, each guide sleeve 200, 202 can include two substantially identical locking mechanisms 700—the first locking mechanism 700 engaged with the first bearing 300, and a second locking mechanism 700 engaged with the second bearing 302.

In an embodiment, the posts 100, 102 can have a smooth outer surface free of external indentations, external notches, grooves, and/or channels. The posts 100, 102 can have an adjustment length, $L_A$, as measured by the length of the segment of the posts 100, 102 that may be exposed from the seat back 4 when the head restraint assembly 1 is at its maximum height.

In this regard, the adjustment length, $L_A$, can be increased by correspondingly increasing the length of $L_P$. In another aspect, $L_A$ can be increased by repositioning the stop feature 108 closer to the leading end 106 of the posts 100, 102.

In a particular embodiment, a ratio of $L_P:L_A$ can be no greater than 4.0, such as no greater than 3.5, no greater than 3.0, no greater than 2.5, no greater than 2.0, no greater than 1.5 no greater than 1.25, or even no greater than 1.1. The ratio of $L_P:L_A$ can be greater than 1.0, such as greater than 1.1, greater than 1.2, greater than 1.3, greater than 1.4, greater than 1.5, greater than 1.6, greater than 1.7, greater than 1.8, greater than 1.9, or even greater than 2.0. Additionally, the value for the ratio of $L_P:L_A$ can be selected from a value as within the range defined above.

The stop feature 108 can be separated from the leading end 106 of the posts 100, 102 a length, $L_{SF}$, as measured between the leading end 106 and the nearest surface of the stop feature 108. In a particular aspect, a ratio of $L_P:L_{SF}$ can be no greater than 100, such as no greater than 75, no greater than 50, no greater than 25, or even no greater than 10. The ratio of $L_P:L_{SF}$ can be no less than 0.5, such as no less than 1, no less than 5, no less than 10, no less than 20, no less than 30, no less than 40, or even no less than 50. Additionally, the value for the ratio of $L_P:L_{SF}$ can be selected from a value as within the range defined above.

In a particular embodiment the guide sleeves 200, 202 can additionally include a stop feature 204, which may be adapted to engage with the stop feature 108 of the posts 100, 102. The stop features 108, 204 can be adapted to prevent the posts 100, 102 from disengaging from the guide sleeve guides 200, 202. The stop features 108, 204 can comprise any feature as would be recognizable to one having ordinary skill in the art for preventing axial disengagement of two substantially concentric components.

For example, as illustrated in FIG. 4, one of the stop features 108, 204 can comprise a radial projection 206 adapted to engage with a corresponding recess 208 in the other stop feature 108, 204. In a particular aspect, the radial projection 206 can be spring biased towards the corresponding recess 208. In this regard, the radial projection 206 can engage with the corresponding recess 208 and can prevent the posts 100, 102 from disengaging from the guide sleeves 200, 202.

Alternatively, the stop features 108, 204 can comprise a molly adapted to be engageable onto one of the posts 100, 102. The molly can be spring biased such that after insertion of the posts 100, 102 through the guide sleeves 200, 202, the molly expands or extends radially outward beyond the guide sleeves 200, 202. This expansion or extension can anchor the stop features 108, 204 and prevent the posts 100, 102 from disengaging from the guide sleeves 200, 202.

Referring again to FIG. 1 through FIG. 3C, the first and second bearings 300, 302 can be adapted to engage around each of the first and second posts 100, 102, respectively. In a number of embodiments, the first and second bearings 300, 302 can disposed in apertures 9, 9' within the outer member (including the first guide sleeve 200 and/or second guide sleeve 202 respectively). In particular embodiments, the bearings 300, 302 can each include at least one leaf spring 400, 402 adapted to bias or assist the inner member 101 (e.g. posts 100, 102) within the bearings 300, 302. In a number of embodiments, the bearing 300, 302 may make contact with the inner member 101 (e.g. posts 100, 102) with at least 90 degrees, such as at least 120 degrees, such as at least 150 degrees, such as at least 180 degrees, such as at least 210 degrees, such as at least 240 degrees, such as at least 270 degrees, such as at least 300 degrees, such as at least 330 degrees of the circumference $C_P$ of the inner member 101 (e.g. posts 100, 102). In a number of embodiments, the bearing 300, 302 may make contact with the inner member 101 (e.g. posts 100, 102) with no greater than 345 degrees, such as no greater than 300 degrees, such as no greater than 270 degrees, such as no greater than 240 degrees, such as no greater than 210 degrees, such as no greater than 180 degrees, such as no greater than 150 degrees, such as no greater than 119 degrees of the circumference $C_P$ of the inner member 101 (e.g. posts 100, 102). In a number of embodiments, the bearing 300, 302 may make contact with the inner member 101 (e.g. posts 100, 102) between about 120 degrees and 330 degrees of the circumference $C_P$ of the inner member 101 (e.g. posts 100, 102). In a number of embodiments, the leaf spring 400 can include a first leaf spring 400 and a second leaf spring 402 within the first aperture 7 and second aperture 7' respectively and adapted to bias or assist the first post 100 and second post 102) within the first bearing 300 and second bearing 302 respectively.

Figure 5A:
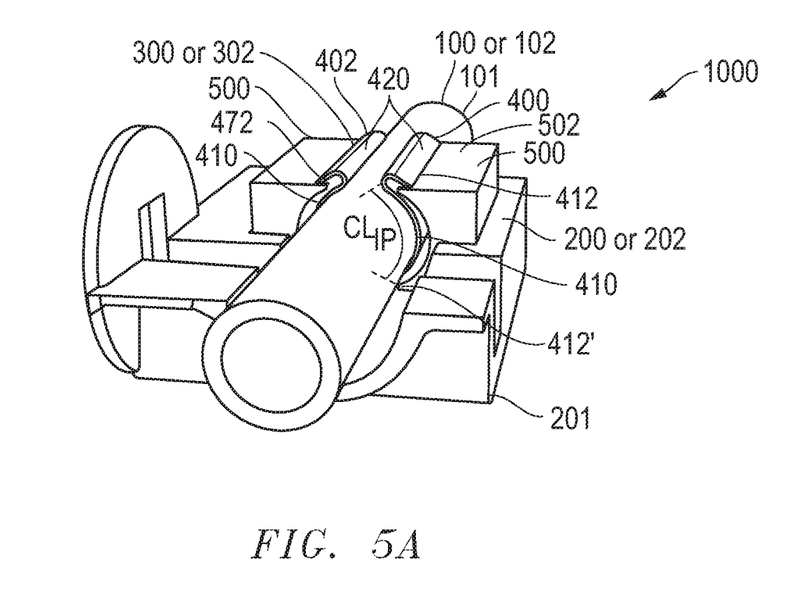
FIG. 5A includes a cross-sectional top plan view of a head restraint assembly in accordance with an embodiment.
Figure 5B:
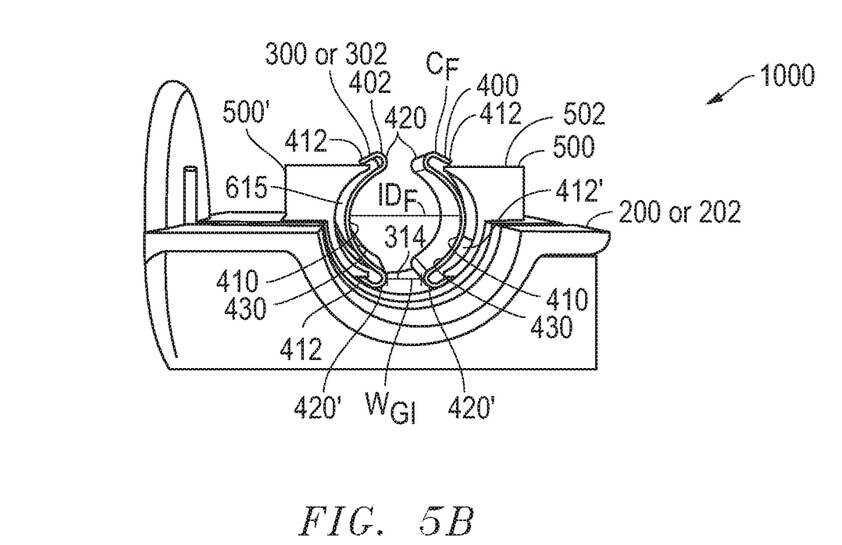
FIG. 5B includes a perspective end view of a head restraint assembly in accordance with an embodiment.
Figure 5C:
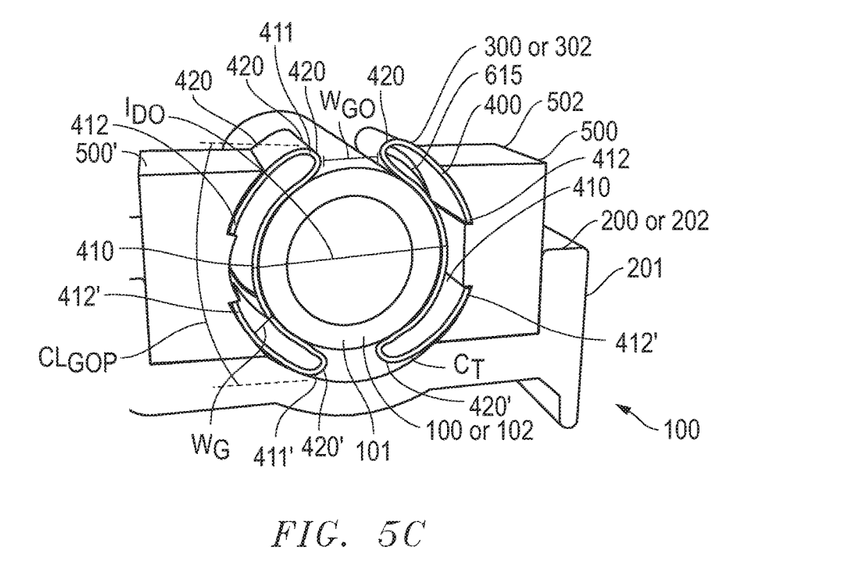
FIG. 5C includes a perspective end view of a head restraint assembly in accordance with an embodiment.

Referring now to FIGS. 5A-5C, in a number of embodiments, each leaf spring 400, 402 can include an inner portion 410 and at least one outer portion 412. In a number of embodiments, each leaf spring 400, 402 can include a plurality of outer portions 412, 412'. In a number of embodiments, the outer portions 412, 412' may each include at least one end portion 420, 420'. In a number of embodiments, the end portions 420, 420' may be folded over such that the outer portions 412, 412' overlie the inner portion 410 in each leaf spring 400, 402 to form at least one folded edge 411, 411'. In a number of embodiments, each leaf spring 400, 402 can include two folded edges 411, 411'. In a number of embodiments, the folded edge 411, 411' of the end portions 420, 420' may form a gap 615 or void between the inner portion 410 and at least one of the outer portions 412, 412' of each leaf spring 400, 402. The gap 615 may form a gap distance $G_P$ between the inner portion 410 and at least one of the outer portions 412, 412' of each leaf spring 400, 402. As shown in FIGS. 5A-5C, each leaf spring 400, 402 can include a circumferential length of the inner portion 410, 410', $CL_{IP}$ between the two folded edges 411, 411'. As shown in FIGS. 5A-5C, each leaf spring 400, 402 can include a circumferential length of the outer portion 412, 412', $CL_{GOP}$ between the two end portions 420, 420'. In a number of embodiments, the circumferential length of the outer portion 412, 412', $CL_{GOP}$ may be up to 0.95 of a circumferential length of the inner portion 410, 410' $CL_{IP}$, such as up to 0.9 $CL_{IP}$, such as up to 0.85 $CL_{IP}$, or such as up to 0.8 $CL_{IP}$. The circumferential length of the outer portion 412, 412', $CL_{GOP}$ may be at least 0.1 of a circumferential length of the inner portion 410, 410' $CL_{IP}$, such as at least 0.15 $CL_{IP}$, or such as at least 0.2 $CL_{IP}$.

In a number of embodiments, at least one leaf spring 400, 402 of each bearing 300, 302 can be locked or fixed to the outer member 201 (including the first guide sleeve 200 and/or second guide sleeve 202) via at least one locking component 500, 500'. In a number of embodiments, the locking component 500, 500' may be fixed to the outer member 201 (including the first guide sleeve 200 and/or second guide sleeve 202). In a number of alternative embodiments, the outer member 201 (including the first guide sleeve 200 and/or second guide sleeve 202) may include the locking component 500. In a number of embodiments, the locking component 500, 500' may include at least one adaptor block 502 that may be adapted to be fixed to the outer member 201 (including the first guide sleeve 200 and/or second guide sleeve 202). In a number of embodiments, the leaf spring 400, 402 can be locked in or fixed to the locking component 500, 500'. In a number of embodiments, the at least one leaf spring 400, 402 of each bearing 300, 302 can be fixed to the outer member 201 (including the first guide sleeve 200 and/or second guide sleeve 202) or locking component 500, 500' by welding, adhesive, fasteners, threading, or any other suitable fastening means. The locking component 500, 500' (including the adaptor block 502) can include a polymer. The locking component 500, 500' (including the adaptor block 502) can include a metal or alloy thereof. In a particular embodiment, the locking component 500, 500' (including the adaptor block 502) can include a ceramic. In a particular embodiment, the locking component 500, 500' (including the adaptor block 502) can include a composite material including a polymer, metal, alloy, ceramic, or combination thereof.

Figure 6:
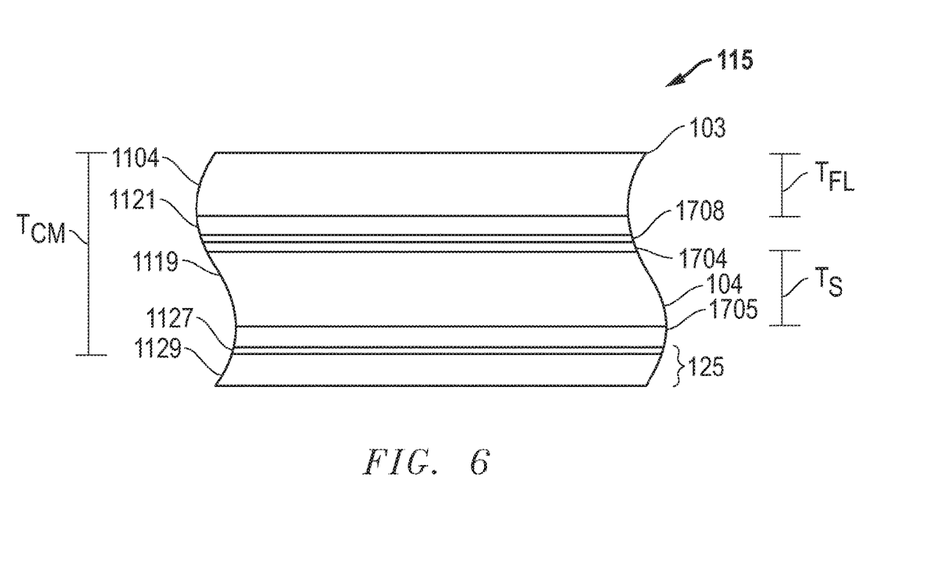
FIG. 6 includes a schematic sectional side view of another embodiment of a bearing having layers and is constructed in accordance with the invention.

In a number of embodiments, as shown in FIG. 6, the bearing 300, 302 (or corresponding leaf spring 400, 402) can include a composite material having a thickness $T_{CM}$. In a number of embodiments, the bearing 300, 302 (or corresponding leaf spring 400, 402) may include a substrate 1119, which may be unitary (i.e. in a single piece). In one embodiment, the substrate 1119 may be formed of a single, continuous sheet of metal, and may be contoured such as by mechanical deformation such as stamping. In other embodiments, the substrate 1119 may be in multiple pieces. In a number of embodiments, the substrate 1119 may include a metal strip. In a number of embodiments, the bearing 300, 302 (or corresponding leaf spring 400, 402) may include a low friction layer 1104. The low friction layer 1104 can be coupled to at least a portion of the substrate 1119. In a particular embodiment, the low friction layer 1104 can be coupled to a surface of the substrate 1119 so as to form a low friction interface with another surface of another component. In a particular embodiment, the low friction layer 1104 can be coupled to the radially inner surface of the substrate 1119 so as to form a low friction interface with another surface of another component. In a particular embodiment, the low friction layer 1104 can be coupled to the radially outer surface of the substrate 1119 so as to form a low friction interface with another surface of another component (such as an inner steering member or outer member). The low friction layer 1104 can be coupled to both the radially inner surface and the radially outer surface of the substrate 1119. In a number of embodiments, the low friction layer 1104 can be coupled to the radially inner surface of the substrate 1119 so as to contact the inner member 101 (including the first and/or second posts 100 and 102 respectively).

In an embodiment, the substrate 1119 can at least partially include a metal, such as aluminum, zinc, copper, magnesium, tin, platinum, titanium, tungsten, iron, bronze, alloys thereof, or may be another type. More particularly, the substrate 1119 can at least partially include a steel, such as a stainless steel or spring steel. For example, the substrate can at least partially include a 301 stainless steel. The 301 stainless steel may be annealed, ¼ hard, ½ hard, ¾ hard, or full hard. The substrate 1119 may include a woven mesh or an expanded metal grid. Alternatively, the woven mesh can be a woven polymer mesh. In an alternate embodiment, the substrate 1119 may not include a mesh or grid. In another alternate embodiment, the substrate 1119, as a solid component, woven mesh or expanded metal grid, may be embedded between at least one adhesive layer 1121 included between the low friction layer 1104 and the substrate 1119. In at least one embodiment, the substrate 1119 may be any kind of metal alloy which provides an elastic behavior under application load in an arcuate shape.

Optionally, the bearing 300, 302 (or corresponding leaf spring 400, 402) may include at least one adhesive layer 1121 that may couple the low friction layer 1103 to the substrate 1119. The adhesive layer 1121 may include any known adhesive material common to the ring arts including, but not limited to, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C═O, —C—O—R, —COH, —COOH, —COOR, —CF$_2$═CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 1121 can have a thickness of about 1 to 50 microns, such as about 7 to 15 microns.

Optionally, the substrate 1119 may be coated with corrosion protection layers 1704 and 1705 to prevent corrosion of the bearing 300, 302 (or corresponding leaf spring 400, 402) prior to processing. Additionally, a chemical conversion layer 1708 can be applied over layer 1704. Each of layers 1704, 1705, and 1708 can have a thickness of about 1 to 50 microns, such as about 7 to 15 microns. Layers 1704 and 1705 can include a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, aluminum, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1705, and chemical conversion layer 1708 can be removed or retained during processing.

Optionally, bearing 300, 302 (or corresponding leaf spring 400, 402) may further include a corrosion resistant coating 1125. The corrosion resistant coating 1125 can have a thickness of about 1 to 50 microns, such as about 5 to 20 microns, and such as about 7 to 15 microns. The corrosion resistant coating can include a chemical conversion layer 1127 and an epoxy layer 1129. The adhesion promoter layer 1127 can include a phosphate of zinc, iron, manganese, tin, or any combination thereof, or a nano-ceramic layer. The chemical conversion layer 1127 can include functional silanes, nano-scaled silane based layers, hydrolyzed silanes, organosilane adhesion promoters, solvent/water based silane primers, chlorinated polyolefins, passivated surfaces, aluminum, or any combination thereof. The epoxy layer 1129 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_xH_yX_zA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In a number of embodiments, the low friction layer 1104 of bearing 300, 302 (or corresponding leaf spring 400, 402) can comprise materials including, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the low friction layer 1104 includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction/wear resistant layer includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The low friction layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof. Fluoropolymers may be used according to particular embodiments. As used herein, a "low friction material" can be a material having a dry static coefficient of friction as measured against steel of less than 0.5, such as less than 0.4, less than 0.3, or even less than 0.2. A "high friction material" can be a material having a dry static coefficient of friction as measured against steel of greater than 0.6, such as greater than 0.7, greater than 0.8, greater than 0.9, or even greater than 1.0.

In a number of embodiments, the low friction layer 1104 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof.

Additionally, the bearings 300, 302 can include lubrication to further enhance sliding characteristics between the bearing 300, 202 and the posts 100, 102. Exemplary lubricants can include molybdenum disulfide, tungsten disulfide, graphite, grapheme, expanded graphite, boron nitrade, talc, calcium fluoride, or any combination thereof. Additionally, the lubricant can comprise alumina, silica, titanium dioxide, calcium fluoride, boron nitride, mica, Wollastonite, silicon carbide, silicon nitride, zirconia, carbon black, pigments, or any combination thereof. A combination of the spring characteristics of the bearing 300, 302 with the low friction/lubrication characteristics of the low friction layer 1104 can provide a low friction sliding surface.

In a particular embodiment, the substrate 1119 can have a thickness, $T_S$, and the low friction layer 1104 can have a thickness, $T_{FL}$. A ratio of $T_S:T_{FL}$ can be at least 1, such as at least 1.5, at least 2, at least 2.5, at least 3, at least 3.5, at least 4, at least 4.5, or even at least 5. The ratio of $T_S:T_{FL}$ can be no greater than 50, such as no greater than 40, no greater than 30, no greater than 20, or even no greater than 10.

Additionally, the ratio of $T_S:T_{FL}$ can be within a range between and including any of the ratio values described above.

In a particular embodiment, the low friction layer 1104 can have a thickness of no less than 0.01 mm, such as no less than 0.05 mm, no less than 0.1 mm, no less than 0.2 mm, no less than 0.3 mm, no less than 0.4 mm, no less than 0.5 mm, no less than 0.6 mm, no less than 0.7 mm, no less than 0.8 mm, no less than 0.9 mm, or even no less than 1 mm. The thickness of the low friction layer 1104 can be no greater than 10 mm, such as no greater than 9 mm, no greater than 8 mm, no greater than 7 mm, no greater than 6 mm, no greater than 5 mm, no greater than 4 mm, no greater than 3 mm, no greater than 2 mm, or even no greater than 1 mm. Additionally, the thickness of the low friction layer 1104 can also be within a range between and including any of the ratio values described above.

In an embodiment, the thickness of the low friction 1104 may be uniform, i.e., a thickness at a first location of the low friction layer 1104 can be equal to a thickness at a second location therealong. In an embodiment, the bearing 300, 302 (or corresponding leaf spring 400, 402) may include a substrate 1119, which may be formed with the low friction layer 1104 on its surface. In a number of embodiments, the substrate 1119 may extend at least partially along a length of the bearing 300, 302 (or corresponding leaf spring 400, 402). The substrate 1119 may be at least partially encapsulated by the low friction or low friction layer 1104. That is, the low friction or low friction layer 1104 may cover at least a portion of the substrate 1119. Axial ends of the substrate 1119 may or may not be exposed from the low friction or low friction layer 1104. In a particular embodiment, the substrate 1119 may be fully encapsulated in the low friction or low friction layer 1104 such that the substrate 1119 may not be visibly perceptible. In another embodiment, the substrate 1119 may include an aperture extending at least partially into the low friction or low friction layer 1104. The aperture can generally reduce stiffness of bearing 300, 302 (or corresponding leaf spring 400, 402), thereby allowing a specific engineered stiffness profile.

In an embodiment, any of the layers on the bearing 300, 302 (or corresponding leaf spring 400, 402), as described above, can each be disposed in a roll and peeled therefrom to join together under pressure, at elevated temperatures (hot or cold pressed or rolled), by an adhesive, or by any combination thereof. In a number of embodiments, any of the layers of the bearing 300, 302 (or corresponding leaf spring 400, 402), as described above, may be laminated together such that they at least partially overlap one another. In a number of embodiments, any of the layers on the bearing 300, 302 (or corresponding leaf spring 400, 402), as described above, may be applied together using a coating technique, such as, for example, physical or chemical vapor deposition, spraying, plating, powder coating, or through other chemical or electrochemical techniques. In a particular embodiment, the low friction layer 1104 may be applied by a roll-to-roll coating process, including for example, extrusion coating. The low friction layer 1104 may be heated to a molten or semi-molten state and extruded through a slot die onto a major surface of the substrate 1119. In another embodiment, the low friction layer 1104 may be cast or molded.

As illustrated in FIG. 5B, in a particular aspect, the bearings 300, 302 can have a functional inner diameter, $ID_F$, as measured between the inner surface 120 of two opposite leaf springs 400, 402 prior to engagement with the posts 100, 102. As shown in FIG. 3A, the inner member 101 (or posts 100,102) can comprise a diameter, $D_P$. In a particular aspect, a ratio of $D_P:ID_F$ can be no greater than 1.5, such as no greater than 1.45, no greater than 1.4, no greater than 1.35, no greater than 1.3, no greater than 1.25, no greater than 1.2, no greater than 1.15, no greater than 1.1, no greater than 1.05, or even no greater than 1.025. The ratio of $D_P:ID_F$ can be no less than 1.005, such as no less than 1.01, no less than 1.02, no less than 1.03, no less than 1.04, no less than 1.05, no less than 1.06, no less than 1.07, no less than 1.08, no less than 1.09, or even no less than 1.1. Additionally, the ratio of $D_P:ID_F$ can also be within a range between and including any of the ratio values described above. In a particular aspect, as the ratio of $D_P:ID_F$ increases, the wave structures 318 can provide a greater radial force against the posts 100, 102. As stated above, n a number of embodiments, the inner member 101 (or posts 100,102) may have a diameter, $D_P$ between 10 and 35 mm.

As shown in FIG. 5B, the bearings 300, 302 can further comprise a total circumference, $C_T$, which can be measured by a best fit circle along an inner surface 430 of the two leaf springs 400, 402 of the bearings 300, 302 prior to insertion of the posts 100, 102 therein. In a particular embodiment, the bearings 300, 302 can have an initial gap 314 between end portion 420, 420' of two leaf springs 400, 402 within each bearing 300, 302. The initial gap 314 can be defined as the gap between end portion 420, 420' of two leaf springs 400, 402 prior to insertion of the posts 100, 102 into the bearings 300, 302. The initial gap 314 can have an initial width, $W_{GI}$, as measured perpendicular between ends 310, 312. A ratio of $W_{GI}:C_T$ can be no greater than 0.30, such as no greater than 0.25, no greater than 0.20, no greater than 0.15, no greater than 0.10, less than 0.05, or even less than 0.04. The ratio of $W_{GI}:C_T$ can be no less than 0.01, such as no less than 0.02, no less than 0.03, no less than 0.04, no less than 0.05, no less than 0.06, no less than 0.07, no less than 0.08, no less than 0.09, or even no less than 0.10. The ratio of $W_{GI}:C_T$ can also be within a range between and including any of the ratio values described above. As used herein, $C_T$ can be understood to include both the circumferential length of the inner surface 336 of the bearing 300, 302 and the length, $W_{GI}$, of the gap 314.

Further, in a particular embodiment, upon insertion of the posts 100, 102 into the bearings 300, 302, the width between the ends 310, 312 can increase to form an operational gap 338 having a width, $W_{GO}$. A ratio of $W_{GO}:W_{GI}$ can be no less than 0.01, such as no less than 0.02, no less than 0.03, no less than 0.04, no less than 0.05, no less than 0.10, no less than 0.15, no less than 0.20, no less than 0.25, no less than 0.30, no less than 0.35, or even no less than 0.40. The ratio of $W_{GO}:W_{GI}$ may be no greater than 0.75, such as no greater than 0.70, no greater than 0.65, no greater than 0.60, no greater than 0.55, no greater than 0.50, no greater than 0.45, no greater than 0.40, no greater than 0.35, no greater than 0.30, no greater than 0.25, no greater than 0.20, no greater than 0.15, no greater than 0.10, or even no greater than 0.05. The ratio of $W_{GO}:W_{GI}$ can also be within a range between and including any of the ratio values described above.

In a further embodiment, the bearings 300, 302 can have an operational inner diameter, $ID_O$, which can be measured between the inner surface 320 of two opposite wave structures 318, 318 after engagement of the bearings 300, 302 with the posts 100, 102. In a particular aspect, a ratio of $ID_O:ID_F$ can be no less than 1.05, such as no less than 1.10, no less than 1.15, no less than 1.20, no less than 1.25, no less than 1.30, no less than 1.35, no less than 1.40, no less than 1.45, no less than 1.50, no less than 1.55, or even no less than 1.60. The ratio of $ID_O:ID_F$ can be no greater than 2.00, such as no greater than 1.75, no greater than 1.50, no greater than 1.25, or even no greater than 1.10. The ratio of $ID_O:ID_F$ can also be within a range between and including any of the ratio values described above.

In a particular aspect, the bearings 300, 302 can have a functional circumference, as measured by a best fit circle along the undeformed portion 316 of the bearings 300, 302 after insertion of the posts 100, 102 therein. A ratio of $C_T:C_F$ can be at least 1.025, at least 1.05, at least 1.1, at least 1.2, at least 1.3, at least 1.4, at least 1.5, at least 1.75, or even at least 2.0. The ratio of $C_T:C_F$ can be less than 5, less than 4, less than 3, less than 2, or even less than 1.5. The ratio of $C_T:C_F$ can also be within a range between and including any of the ratio values described above.

In a particular embodiment, the bearings 300, 302 can be adapted to apply a radially inward force against the posts 100, 102 so as to form a "zero-clearance" fit therebetween. In this regard, a zero-clearance fit can be formed between the bearings 300, 302 and the posts 100, 102. As used herein, the term "zero-clearance" is defined by an engagement between a bearing and a post substantially devoid of perceptible radial play or movement upon application of a force against the bearing perpendicular to the central axis of the bearing.

In a particular aspect, it may be desirable for the bearings 300, 302 to provide a high degree of radial stiffness to the posts 100, 102 while simultaneously permitting low axial sliding forces of the posts 100, 102 within the bearings 300, 302. In this regard, the head restraint assembly 1 can support high normal loads while simultaneously permitting translation of the posts 100, 102 within the bearings 300, 302 upon application of a minimal axial load.

In a particular embodiment, the bearings 300, 302 can form an interference fit with the posts 100, 102 such that the bearings 300, 302 can provide the posts 100, 102 with a radial stiffness of no less than about 2,000 N/mm while simultaneously allowing the posts to translate upon an axial sliding force of no greater than about 30 N. In further embodiments, the bearings 300, 302 can provide the posts with a radial stiffness of no less than about 2,250 N/mm, no less than about 2,500 N/mm, no less than about 2,750 N/mm, no less than about 3,000 N/mm, no less than about 3,500 N/mm, or no less than about 4,000 N/mm. Radial stiffness of the bearings 300, 302 can be measured after insertion of the posts 100, 102 in the bearings 300, 302. For example, after one of the posts 100, 102 has been inserted into one of the bearings 300, 302 as previously described, the radial stiffness of the post 100, 102 and bearing 300, 302 preassembly can be determined by fixing one of the post 100, 102 or bearings 300, 302 and applying a perpendicular normal force to the other one of the post 100, 102 or bearings 300, 302. The force necessary to affect radial movement of one of the posts 100, 102 or bearings 300, 302 can be determinative of the radial stiffness of the bearings 300, 302.

In particular embodiments, the bearings 300, 302 can provide a desired radial stiffness while simultaneously permitting axial translation of the posts 100, 102 therein upon application of an axial sliding force of no greater than about 29 N, no greater than about 28 N, no greater than about 27 N, no greater than about 26 N, no greater than about 25 N, no greater than about 24 N, no greater than about 23 N, no greater than about 22 N, no greater than about 21 N, no greater than about 20 N, no greater than about 19 N, no greater than about 18 N, no greater than about 17 N, no greater than about 16 N, no greater than about 15 N, no greater than about 14 N, no greater than about 13 N. In this regard, the bearings 300, 302 can provide an affective resistance to radial movement while permitting axial translation of the posts 100, 102 upon application of a minimal longitudinal force.

In this regard, in particular embodiments, the bearing(s) can have an assembled radial stiffness of no less than about 1,000 N/mm while requiring an initial assembly force of no greater than about 100 N. In further embodiments, the bearing(s) can have an assembled radial stiffness of no less than about 1100 N/mm, such as no less than about 1200 N/mm, no less than about 1300 N/mm, no less than about 1500 N/mm, no less than about 1700 N/mm, no less than about 2000 N/mm, no less than about 2100 N/mm, no less than about 2200 N/mm, no less than about 2300 N/mm, no less than about 2400 N/mm, no less than about 2500 N/mm, no less than about 3000 N/mm, no less than about 3500 N/mm, or even no less than about 4000 N/mm. In yet other embodiments, the bearing(s) can have an assembled radial stiffness of no greater than about 7500 N/mm, such as no greater than about 7000 N/mm, no greater than about 6500 N/mm, no greater than about 6000 N/mm, no greater than about 5500 N/mm, or even no greater than about 5000 N/mm. Moreover, the assembled radial stiffness of the bearing(s) can also be within a range between and including any of the values described above, such as, for example, between about 4500 N/mm and about 4800 N/mm. In particular embodiments the bearing(s) can be adapted to have an assembled radial stiffness within the range described above while simultaneously having an assembly force of no greater than about 100 N, such as no greater than about 95 N, no greater than about 90 N, no greater than about 85 N, no greater than about 80 N, or even no greater than about 75 N.

Embodiments herein can reduce frictional resistance between components of assembly, allowing for easier translation of the headrest relative the seat back. In accordance with embodiments herein, head restraint assemblies are provided that can eliminate or substantially reduce vibration, or noise of the assembly 1 between any components of the assembly.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. A head restraint assembly comprising: a headrest comprising an inner member; a seat back comprising an outer member; and a bearing disposed between the inner member and the outer member; the bearing comprising: at least one leaf spring adapted to bias the inner member, wherein the leaf spring comprises a substrate and a low friction layer overlying the substrate, wherein the leaf spring comprises an inner portion and a plurality of outer portions, wherein the outer portions comprise end portions of the leaf spring that are folded over such that the outer portions overlie the inner portion, forming a folded edge, wherein the headrest is adapted to translate with respect to the seat back, and wherein the seat back is adapted to receive the headrest such that the headrest is height adjustable relative to a seat back.

Embodiment 2. An assembly of embodiment 1, wherein the low friction layer contacts the inner member.

Embodiment 3. An assembly of any of the preceding embodiments, wherein the leaf spring comprises a gap between the inner portion and the outer portions.

Embodiment 4. An assembly of any of the preceding embodiments, wherein the leaf spring is locked into the outer member via a locking component.

Embodiment 5. An assembly of embodiment 4, wherein the locking component comprises an adaptor block.

Embodiment 6. An assembly of any of the preceding embodiments, wherein the low friction layer comprises a fluoropolymer.

Embodiment 7. An assembly of any of the preceding embodiments, wherein the low friction layer comprises polytetrafluoroethylene.

Embodiment 8. An assembly of any of the preceding embodiments, wherein the substrate comprises aluminum, steel, or an alloy thereof.

Embodiment 9. An assembly of any of the preceding embodiments, wherein the adaptor block comprises a polymer.

Embodiment 10. An assembly of any of the preceding embodiments, wherein the bearing is disposed in an aperture in the outer member.

Embodiment 11. An assembly of any of the preceding embodiments, wherein the inner member comprises at least one post.

Embodiment 12. An assembly of any of the preceding embodiments, wherein the inner member comprises a first post and a second post.

Embodiment 13. An assembly of any of the preceding embodiments, wherein the outer member comprises at least one guide sleeve.

Embodiment 14. An assembly of any of the preceding embodiments, wherein the inner member comprises a first guide sleeve and a second guide sleeve.

Embodiment 15. An assembly of embodiment 12, wherein the first post and a second post both are disposed in the outer member between the bearing and a second bearing respectively.

Embodiment 16. An assembly of embodiment 12, wherein the second bearing comprises: at least one leaf spring adapted to bias the second inner member, wherein the leaf spring comprises a substrate and a low friction layer overlying the substrate, wherein the leaf spring comprises an inner portion and a plurality of outer portions, wherein the outer portions comprise end portions of the leaf spring that are folded over such that the outer portions overlie the inner portion, forming a folded edge and a gap between the inner portion and the outer portions, wherein the headrest is adapted to translate with respect to the seat back, and wherein the seat back is adapted to receive the headrest such that the headrest is height adjustable relative to a seat back.

Embodiment 17. An assembly of any of the preceding embodiments, wherein the second bearing is disposed in a second aperture in the outer member.

Embodiment 18. An assembly of any of the preceding embodiments, wherein the inner member has a diameter between 10 and 35 mm.

Embodiment 19. An assembly of any of the preceding embodiments, wherein the inner member layer comprises a metal or alloy thereof.

Embodiment 20. An assembly of any of the preceding embodiments, wherein the outer member comprises a polymer.

Embodiment 21. An assembly of any of the preceding embodiments, wherein the bearing makes contact with the inner member between 120 and 330° of the circumference of the inner member.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A head restraint assembly comprising:
   a headrest comprising an inner member;
   a seat back comprising an outer member; and
   a bearing disposed between the inner member and the outer member; the bearing comprising:
      at least one leaf spring adapted to bias the inner member, wherein the leaf spring comprises a substrate and a low friction layer overlying the substrate, wherein the leaf spring comprises an inner portion and a plurality of outer portions, wherein the outer portions comprise end portions of the leaf spring that are folded over such that the outer portions overlie the inner portion, forming a folded edge, wherein the headrest is adapted to translate with respect to the seat back, and wherein the seat back is adapted to receive the headrest such that the headrest is height adjustable relative to a seat back.

2. The assembly of claim 1, wherein the low friction layer contacts the inner member.

3. The assembly of claim 1, wherein the leaf spring comprises a gap between the inner portion and the outer portions.

4. The assembly of claim 1, wherein the leaf spring is locked into the outer member via a locking component.

5. The assembly of claim 4, wherein the locking component comprises an adaptor block.

6. The assembly of claim 1, wherein the low friction layer comprises a fluoropolymer.

7. The assembly of claim 1, wherein the substrate comprises aluminum, steel, or an alloy thereof.

8. The assembly of claim 1, wherein the adaptor block comprises a polymer.

9. The assembly of claim 1, wherein the inner member comprises at least one post.

10. The assembly of claim 1, wherein the outer member comprises at least one guide sleeve.

11. The assembly of claim 9, wherein the first post and a second post both are disposed in the outer member between the bearing and a second bearing respectively.

12. The assembly of claim 11, wherein the second bearing comprises:
- at least one leaf spring adapted to bias the second inner member, wherein the leaf spring comprises a substrate and a low friction layer overlying the substrate, wherein the leaf spring comprises an inner portion and a plurality of outer portions, wherein the outer portions comprise end portions of the leaf spring that are folded over such that the outer portions overlie the inner portion, forming a folded edge and a gap between the inner portion and the outer portions, wherein the headrest is adapted to translate with respect to the seat back, and wherein the seat back is adapted to receive the headrest such that the headrest is height adjustable relative to a seat back.

13. The assembly of claim 12, wherein the second bearing is disposed in a second aperture in the outer member.

14. The assembly of claim 1, wherein the inner member has a diameter between 10 and 35 mm.

15. The assembly of claim 1, wherein the bearing makes contact with the inner member between 120 and 330° of the circumference of the inner member.

* * * * *